United States Patent [19]

Hargarten et al.

[11] Patent Number: 5,206,570
[45] Date of Patent: Apr. 27, 1993

[54] ACTUATOR SERVO COMPENSATION METHOD

[75] Inventors: Jim Hargarten, Lafayette; Gary Counts, Aruada; Scott Chase, Longmont, all of Colo.

[73] Assignee: Maxtor Corporation, San Jose, Calif.

[21] Appl. No.: 671,500

[22] Filed: Mar. 19, 1991

[51] Int. Cl.$^5$ .................. G05B 13/00; G11B 21/08
[52] U.S. Cl. .................. 318/611; 318/561; 318/619; 318/615; 360/77.02; 360/78.04; 369/32; 369/13
[58] Field of Search ............. 318/560–640, 318/257; 360/72–79, 114, 66; 369/13, 14, 32

[56] References Cited

U.S. PATENT DOCUMENTS

| | | | |
|---|---|---|---|
| 3,673,512 | 6/1972 | Walters | 318/618 X |
| 3,808,486 | 4/1974 | Cuda et al. | 318/620 |
| 3,820,712 | 6/1974 | Oswald | 318/618 X |
| 3,947,737 | 3/1976 | Kimura et al. | 318/257 |
| 3,953,774 | 4/1976 | Sato et al. | 318/594 |
| 4,096,426 | 6/1978 | Tremaine et al. | 318/611 |
| 4,268,785 | 5/1981 | Svendsen | 318/608 |
| 4,321,517 | 3/1982 | Touchton et al. | 318/618 |
| 4,403,179 | 9/1983 | Kohzai et al. | 318/632 |
| 4,498,037 | 2/1985 | Razavi | 318/561 |
| 4,499,412 | 2/1985 | Locher et al. | 318/609 |
| 4,594,622 | 6/1986 | Wallis | 318/561 X |
| 4,639,652 | 1/1987 | Takahashi et al. | 318/568 |
| 4,691,152 | 9/1987 | Ell et al. | 318/616 |
| 4,697,127 | 9/1987 | Stich et al. | 318/561 |
| 4,839,573 | 6/1989 | Wise | 318/615 |
| 4,902,944 | 2/1990 | Hirata | 318/608 |
| 4,963,806 | 10/1990 | Shinohara et al. | 318/621 |
| 5,010,535 | 4/1991 | Davis | 369/32 |
| 5,111,440 | 5/1992 | Mathildus et al. | 369/13 |

Primary Examiner—Paul Ip
Attorney, Agent, or Firm—Hecker & Harriman

[57] ABSTRACT

An actuator control loop for controlling head position in a rotating media data storage system. The invention applies the compensation zero to the PES prior to summing it with the integrator. This scheme reduces transients caused by the integrator initialization step because the zero does not "see" the integrator initialization step. Transients that can result from coupling the integrator initialization to the zero can cause overshoot and ringing in the actuator, increasing settling time and reducing system performance. The present invention also provides a first sample velocity compensation scheme that removes the velocity correction factor from the PES signal in the first sample after a seek. This significantly reduces settling time and improves system performance. In one embodiment, the microprocessor of the present invention calculates a velocity compensation factor based on the PES signal. This signal is then superimposed on the integrator output. In another embodiment, the zero is moved during the first sample after a seek, so that no velocity correction is undertaken. In subsequent sample periods, the zero is returned to its desired frequency.

23 Claims, 4 Drawing Sheets

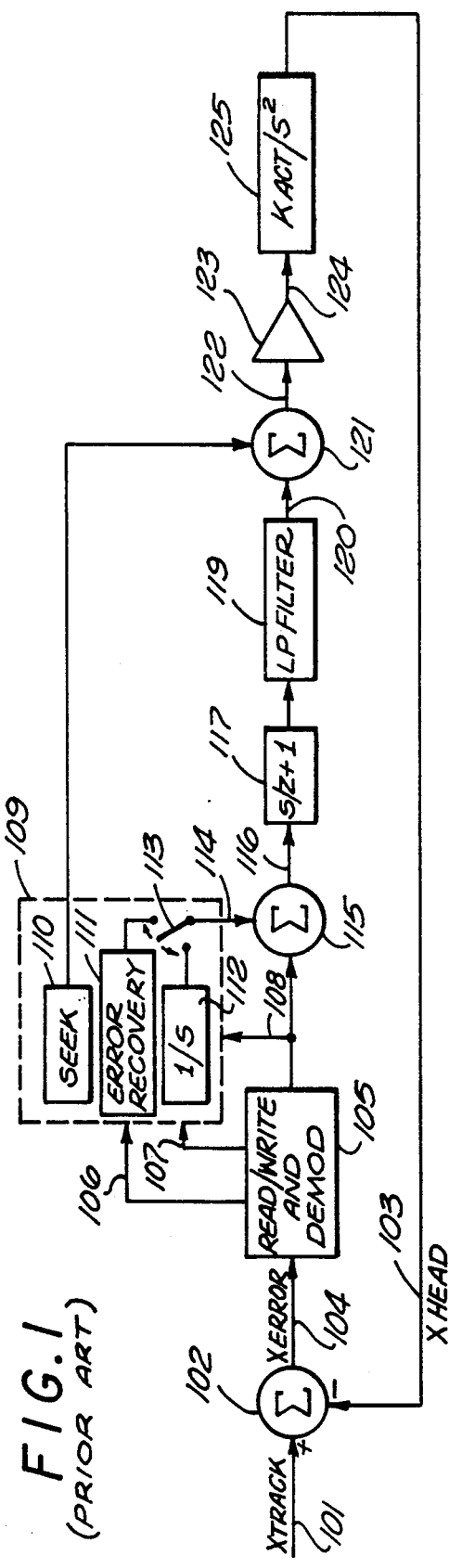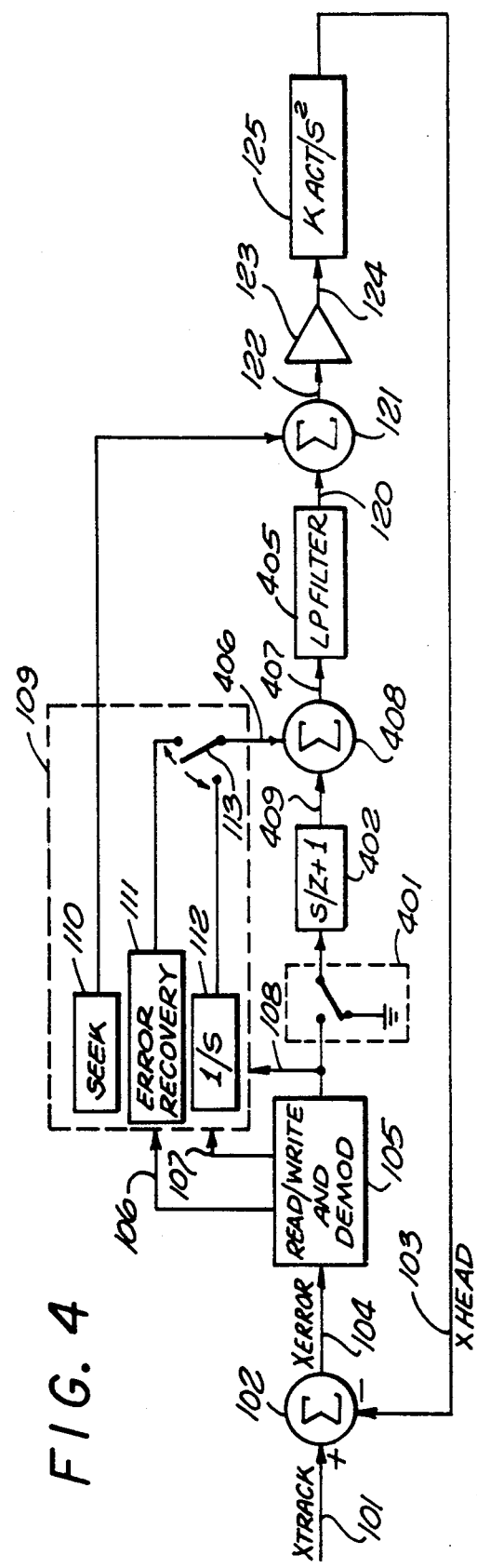

ACTUATOR SERVO COMPENSATION METHOD

BACKGROUND OF THE INVENTION

1. Field of the Invention

This invention relates to the field of read/write head positioning schemes for rotating media storage systems.

2. Background Art

In a typical rotating medium storage system, data is stored on magnetic or magneto optic disks in a series of concentric or spiral "tracks." These tracks are accessed by read/write heads that detect variations in a magnetic orientation of the disk surface. The heads are mounted to an arm that is in turn mounted to an actuator motor. The arm may be pivotally mounted to the actuator motor, (much like the tone arm of a phonograph), or a linear actuator motor may be used so that the path of motion of the read/write heads is along a radius of the disk itself.

The actuator motor is typically a "voice coil" electrodynamic motor that has a coil moving within a permanent magnet, defining a cylindrical core. Alternatively, the motor may have a "rotary" type coil, such as is described in U.S. Pat. No. 4,805,055. The actuator motor is used to move the heads back and forth over the disk surface. The velocity of the heads as they move across the disk surface is dependent on the amount of current transmitted to the coil.

In the operation of a disk drive, it is often necessary to move the read/write heads from a current track to a desired track. This move is often between non-adjacent tracks and is referred to as a "seek" operation. In a seek operation, a command is provided to the disk drive to access a certain sector or sectors of information. If the heads are not currently over the track containing the desired sectors, a "seek profile" is determined. A seek profile describes the acceleration, deceleration, velocity and position information of the heads in moving from a current track to a destination track. The appropriate current is provided to the actuator motor to move the heads to the destination track, following the seek profile. Periodically, the actual position and/or velocity of the heads is compared to the seek profile. Adjustments are made to the current supplied to the actuator motor, if necessary, so that the heads follow the seek profile.

In the present description a track represents a radial location on the surface of one storage disk. A "cylinder" refers to the three dimensional path traced by the same radial position on a plurality of disk surfaces, such as in a multi-disk storage system.

When a data track has been accessed, it is important that the read/write head be kept on the center line of that track for accurate reading and writing operations. This positioning of the read/write head on the center line of a track is known as "track following." Variations from the center line of the track being followed produce a position error signal (PES) that is used to generate a corrective input to the head positioning apparatus to move the head back to the center line position.

Servo position information on either side of the center line of a data track is read and detected by the magnetic heads. A PES is generated and represents deviation of the magnetic head from the track center. A positive or negative PES indicates that the head is off center in one direction or the other, and suitable correction signals are generated.

Seeks and track following operations are performed under the control of a head positioning "servo" mechanism. Position information is provided through the use of special servo patterns recorded on the surface of the disk. A servo pattern is a permanent pattern prerecorded on the storage disk at the time of assembly of the completed disk drive. The servo pattern represents position information such as track position information, sector number, index, etc. The servo pattern is detected by the head, and after appropriate signal processing, yields track position information. There are a number of methods of providing servo data in a disk drive, including "dedicated" servo and "sector" servo.

In a dedicated servo scheme, one entire surface of a disk contains servo information. A servo head accesses the servo surface of the servo disk to read the position information stored thereon. The servo head is in a fixed relationship relative to the read/write heads, so that the position of the servo head can be used to indicate the position of the read/write heads. A dedicated servo scheme is often used in disk drives having multiple disks. In a single disk system, a dedicated servo scheme is not practical, since 50% of the available storage area (one surface of the two sided disk) is unavailable for data storage. The disk surface area that is dedicated to servo tracks cannot be used for data tracks.

In the sector servo method, bursts of servo information are disposed on a disk surface in between data areas. Each servo burst contains track position information, track radial address fields and index information. Space division multiplexing of data and servo information minimizes track misregistration effects, since both data and servo information are reproduced from the same surface with a common head. The sector scheme is more efficient in single disk applications, since more disk surface area is available for data storage.

The head position is controlled by an actuator control system. The actuator control system obtains actual head position information from the servo pattern and compares it to desired head position information. When a position error is detected, the actuator control system provides a correcting current to the actuator motor to move the head to the desired position.

An example of a prior art actuator control system is illustrated in FIG. 1. FIG. 1 is a block diagram of a head position control loop. A desired track position 101, $X_{track}$, is provided as an input to summing node 102. The summing node 102 is implemented as part of the disk drive actuator/head/disk assembly. $X_{head}$ 103, the actual head position, is provided to an inverting input of summing node 102. The difference between actual head position and desired track position is the output of summing node 102 and is $X_{error}$ 104.

The $X_{error}$ 104 is provided to head read/write electronics, pulse detect and demodulator block 105. Block 105 demodulates $X_{error}$ 104 and provides three output signals, cylinder number 106, the quadrature component 107 and the normal component 108 of $X_{error}$ 104. The normal component 108 is considered to be the PES. These signals are provided as input to a control microprocessor, generally indicated by dashed line 109. The microprocessor controls the three head positioning functions and operations; seeking, (indicated symbolically by seek block 110); error recovery, (indicated by block 111); and track following, (indicated symbolically by integrating block 112).

During seek operations, the seek block 110 is enabled and the seek is executed. During seek operations, the circuitry to the left of summing node 121 is disabled.

The seek operation may be implemented by any of many well known control algorithms.

The error recovery block 111 is enabled when the heads are offset from a desired track by a large amount (on the order of several tracks). During error recovery, switch 113 is coupled to block 111 and the circuitry to the left of summing node 115 is disabled.

Track following block 112 is enabled when reading from or writing to a track so that the heads track the center line of the data track. Track following is enabled when the PES is small enough for the track follow system to acquire the track. For example, if the amplitude of PES is less than or equal to three quarters of a track, track following is enabled. Track following is also used at the end of a seek operation to correct for any offsets in desired track position and actual track position. In track following mode, block 112 is coupled to switch 113 and the seek block 110 is disabled.

The normal component 108 is also provided as an input to summing node 115. The output of error recovery block 111 or integrating block 112 (depending on the mode of operation) is coupled through switch 113 to summing node 115 on line 114. The output 116 of summing node 115 is provided to compensating block 117 which is a real zero. The output 118 of compensating block 117 is provided as an input to low pass filter 119. The output 120 of low pass filter 119 is coupled to summing node 121 along with the output of seek block 110.

The output 122 of summing node 121 is coupled to transimpedance (or current-controlled) power amplifier 123. The output 124 of amplifier 123 is provided to actuator control block 125. The output 103 of actuator control block 125 is the actual head position signal $X_{head}$ 103.

In typical disk drive operation, the actual head position at the end of a seek may be offset from the desired track position by some fraction of a track or by one or more tracks. At the end of a seek operation, actual position is determined and compared to ideal head position. This comparison is used to generate a position error signal that is used to generate an actuator drive signal. The disk drive uses this PES as input to the track following circuitry to cause the actuator to move the head to the desired location. The track following compensation is shown in detail in FIG. 2.

In FIG. 2, the normal component 108 of the PES signal is provided to the micro-processor 109 and to a gain block 201. In the example of FIG. 2, the gain block has a gain of one. The normal component 108 is provided to the track following block 112 of the microprocessor 109. This track following block is an integrator plus an A/D and D/A with a transfer function of k/s. The output 114 of the integrating block 112 is provided to summing node 115 along with the output 202 of gain block 201. The output 116 of the summing node 115 is provided to compensating block 117.

Compensating block 117 has a transfer function of (s/z+1). The output 118 of the compensating block 117 is provided to low pass filter 119. The output of low pass filter 119 is output 120. The low pass filter 119 has a transfer function of:

$$\frac{1}{\frac{s^2}{(\omega_n)^2} + \frac{s}{\omega_n Q} + 1}$$

The track following block 112 is used to generate a correction signal so that the read/write head can be moved to the center line of the desired track in the presence of external bias forces.

Theoretically, once the heads have been positioned over a track and have been brought to zero velocity after a seek, the actuator motor does not require any current to hold the heads in place. In actual operation however, windage forces and biases, such as caused by a flex circuit on an actuator arm head assembly, can cause biasing forces on the heads, so that some actuator current is required to maintain head position. These forces can vary with radial head position. Because of this, the current required to keep the actuator in place at different radial positions on the disk drive varies. To compensate for these variations, a diagnostic program is executed to determine and calibrate the current required to hold the actuator in place at different track locations. Typically, these track locations are divided into zones and a calibrated value is stored for each zone in a look-up table. When a seek to a particular zone is performed, the calibrated value is retrieved for that zone and the integration block 112 is initialized to a certain state to compensate for the biasing forces at that location.

When the track seek is to a particular zone, the microprocessor 109 initializes the integrator 112 to this predetermined value. Then, any corrected value indicated by the PES is superimposed on this value so that the read/write heads are moved to the correct positions. This initialization of the integrator is a step function. This scheme results in a disadvantage when the output of the summing node 115 is provided to the zero block 117. The effect of the initialization step function is to provide a large step response that adversely affects head position.

A graph showing head position versus time for a step of the integrator output is illustrated in FIG. 3. The curve 301 represents the response for a unitary input. At peak 302, the response is 60 times the input. At peak 303, the response is minus 20 times the input. This ringing effect continues at peaks 304, 305, 306, etc., until settling occurs (approximately 2.5 milliseconds.) This large response causes the ringing illustrated in FIG. 3 and extends the settling time.

Another disadvantage of prior art control systems is referred to herein as "first sample velocity correction". At the end of a seek operation, head velocity is zero and therefore does not need to be corrected. However, in the first sample after the head comes to the stop, the PES includes correction for a velocity error. This causes an overshoot in the response output.

A number of prior art attempts have been made to provide actuator control systems. Alaimo, U.S. Pat. No. 4,488,187, discloses a digital servo mechanism for read/write head positioning. This mechanism allows for accurate positioning including temperature compensation with a minimum of components. This is accomplished through a different servo pattern. The demodulator is implemented digitally.

Stephens, U.S. Pat. No. 4,575,776, discloses a servo mechanism that incorporates a model of the voice coil motor so that the position error signal can be simulated from a sampled or intermittent error signal. This implementation allows the use of a sector servo scheme instead of dedicated servo patterns.

The invention in Wallis, U.S. Pat. No. 4,594,622, is directed toward the prediction of data track eccentricity and the incorporation of this prediction into the feedback loop of the servo. This modification allows for more accurate and more responsive track following.

Workman, U.S. Pat. No. 4,616,276, is also directed toward measuring track eccentricity and incorporating a prediction of eccentricity into the servo control mechanism. In particular, a method is disclosed for approximating eccentricity in terms of sine functions an for making interactive tracking corrections.

Berti, U.S. Pat. No. 4,616,277, discloses a method for minimizing the mechanical coupling effects of the magnetic head actuators employed on disk drives. In this method, a signal that anticipates and negates the coupling force is provided to a voice coil motor to minimize the response due to the force of a neighboring actuator in operation.

The invention described by Ottesen, U.S. Pat. No. 4,894,599, addresses settling response in single seeks. By incorporating a deadbeat control in the servo, a single track seek can be accurately compensated.

Genheimer, U.S. Pat. No. 4,899,234, describes an adaptable velocity profile for optimizing the many track seek performance of a disk drive. The method disclosed minimizes performance degradation due to variations in temperature, voltage, and actuator characteristics.

SUMMARY OF THE INVENTION

The present invention provides an actuator control loop for controlling head position in a rotating media data storage system. The invention applies analog compensation to the PES prior to summing it with a digital integrator. This scheme reduces transients caused by the initialization of the integrator because the compensating block does not "see" the initialization step function. Transients that can result from coupling the initialization function to the compensating block can cause overshoot and ringing in the actuator, increasing settling time and reducing system performance.

The present invention implements a track following loop as follows. The normal component of the PES is coupled to a digital integrator block and to an analog compensating block. The integrator block is initialized, dependent upon radial head position. The output of the integrator is summed with the output of the compensating block and the resultant is passed through a low pass filter. Transients caused by the initialization function coupled to the compensating block are therefore eliminated.

The present invention also provides a first sample velocity compensation scheme that removes the velocity correction factor from the PES signal in the first sample after a seek. This significantly reduces settling time and improves system performance. In one embodiment, the microprocessor of the present invention calculates a velocity compensation factor based on the normal component of the PES signal. This signal is then superimposed on the integrator output to reduce the effects of velocity correction in the compensating block. In another embodiment, the compensating block is disabled during the first sample after a seek, so that no velocity correction is undertaken. In subsequent sample periods, the zero block is re-enabled.

BRIEF DESCRIPTION OF THE DRAWINGS

FIG. 1 is a block diagram of a prior art actuator control loop.

FIG. 4 is a block diagram of an actuator control loop of the present invention.

DETAILED DESCRIPTION OF THE INVENTION

Figure 2:
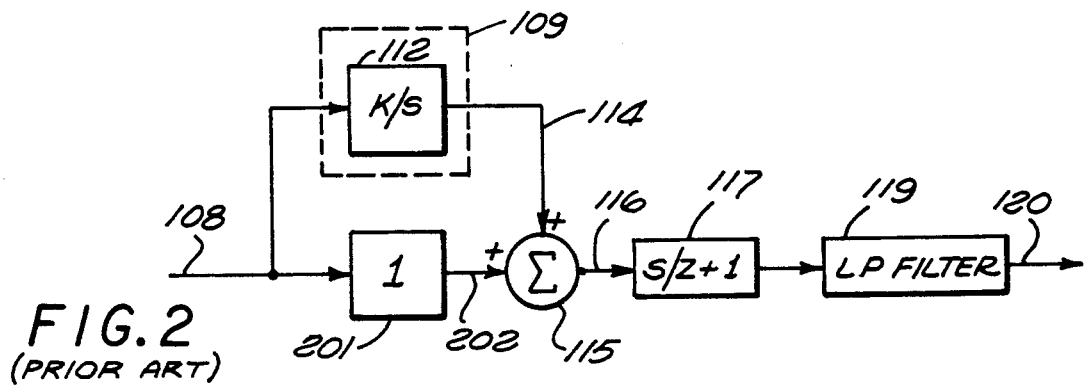
FIG. 2 is a block diagram of a prior art track following compensation.

A method and apparatus for positioning a read/write head is described. In the following description, numerous specific details such as settling time, bandwidth, etc., are set forth in detail in order to provide a more thorough description of the present invention. It will be apparent however, to one skilled in the art, that the invention may be practiced without these specific details. In other instances, well known features have not been described in detail so as not to unnecessarily obscure the present invention.

A block diagram illustrating the preferred embodiment of the present invention is illustrated in FIG. 4. The embodiment of FIG. 4 includes many of the same elements as FIG. 1. The elements that are common to both FIG. 1 and FIG. 4 have like element numbers. In the embodiment of FIG. 4, compensating block 402 is positioned in front of the summing node 408. The output of the microprocessor 109 is not passed through the compensating block 402. Thus, the transients caused by the prior art configuration are eliminated and settling time is reduced. In one embodiment of the present invention, a switch block 401 referred to as "early off" is coupled between the output 108 of pulse and detect block 105 and the input of compensating block 402. Early off block is 401 is a microprocessor controlled switch that resets the normal component 108 after one-half sample period. This system can aid in reducing phase loss and is described in a copending patent application assigned to the assignee of the present invention. The early off block 401 is not required for operation of the present invention.

Figure 5:
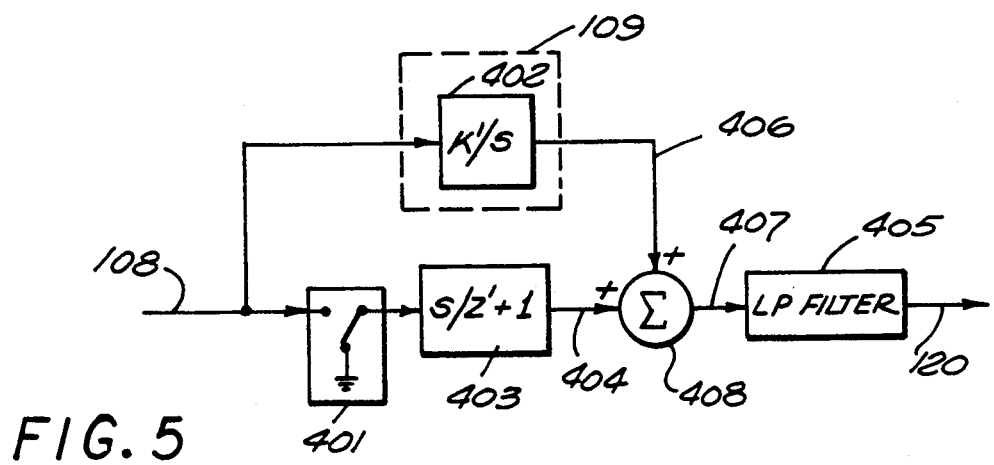
FIG. 5 is a block diagram of a track following compensation of the present invention.

A detailed illustration of the track following compensation of the present invention is illustrated in FIG. 5. The normal component 108 of the PES is provided to an integrator block 402 implemented in the microprocessor 109. The integrator block 402 has a transfer function of $K'/s$, where s is the Laplace variable. The output 406 of integrator block 402 is provided to summing node 408. The PES signal 108 is coupled to compensating block 403. Compensating block 403 implements a transfer function of $(s/Z')+1$. The output 404 of compensating block 403 is provided to summing node 408. The output 407 of summing node 408 is provided to low pass filter 405. Low pass filter 405 outputs signal 120.

Figure 3:
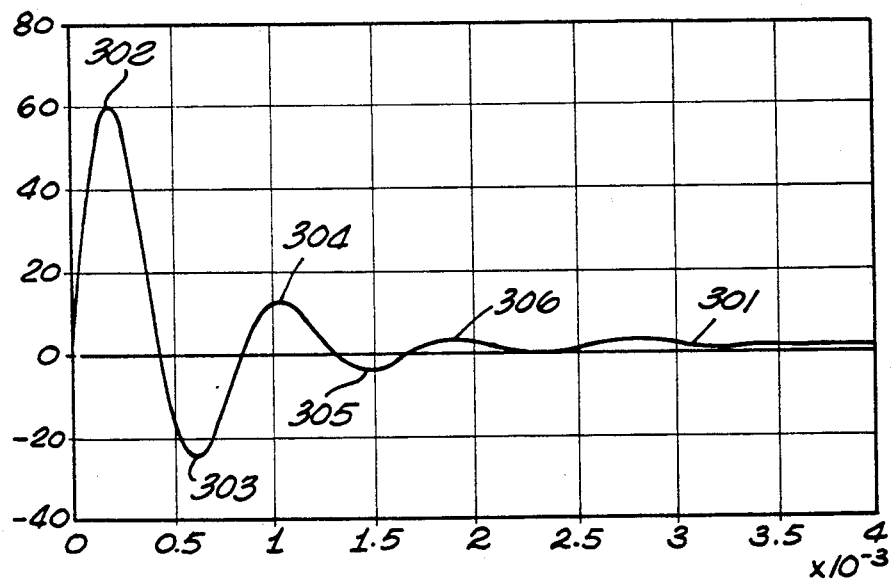
FIG. 3 is a diagram illustrating output response versus time for a step of the integrator for prior art track following compensation.
Figure 6:
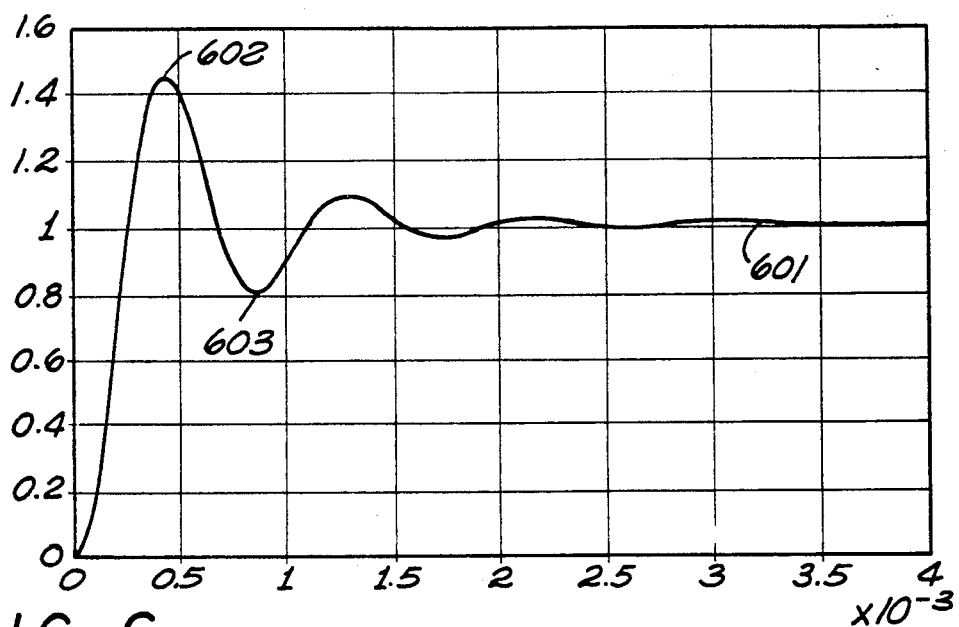
FIG. 6 is a timing diagram illustrating output response versus time for a step of the integrator for the track following compensation of the present invention.

A diagram illustrating the output response of the circuit of FIG. 5 is illustrated in FIG. 6 for a step of the integrator output. Curve 601 represents the output for a unit input. The transients in the output function are greatly reduced. For example, at peak 602 the output is only 1.4 times the input. This compares to the prior art in which the first transient resulted in an output 60 times the input value. The second peak 603 is still positive and has a value of 0.8 times the input value. In this case, the output value does not go negative as in the prior art (see FIG. 3).

In the present invention, the output is settled to an output of substantially one at 1.5 milliseconds. This is a full millisecond sooner than the prior art example. This reduced settling times increases performances and reduces access time.

The transfer functions for the track following compensation of FIG. 2 are as follows:

$$((K/s) + 1)((s/Z) + 1) / \left( \frac{s}{(\omega_n)^2} + \frac{s}{\omega_n Q} + 1 \right) \quad \text{(Equation 1)}$$

This becomes:

$$[(s^2/Z) + ((K/Z) + 1)s + K] / \left( \frac{s}{(\omega_n)^2} + \frac{s}{\omega_n Q} + 1 \right) s \quad \text{(Equation 2)}$$

The transfer function for the track following compensation of FIG. 5 is given by:

$$[(K'/s) + (s/Z') + 1] / \left( \frac{s}{(\omega_n)^2} + \frac{s}{\omega_n Q} + 1 \right) \quad \text{(Equation 3)}$$

This becomes:

$$[K' + (s^2/Z') + s]/s \left( \frac{s}{(\omega_n)^2} + \frac{s}{\omega_n Q} + 1 \right) \quad \text{(Equation 4)}$$

The transfer functions of the circuit of FIG. 2 and FIG. 5 can be made equal by selecting appropriate values for K, Z, K', and Z'. Therefore, the transfer function is identical but the transient response caused by the integrator initialization step is reduced, improving performance.

Figure 7:
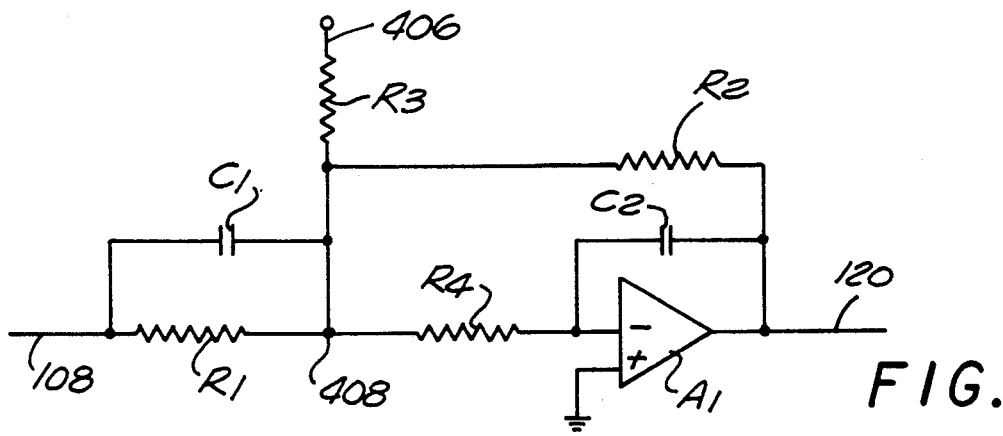
FIG. 7 is a circuit diagram illustrating the present invention.

A circuit for implementing the scheme of FIG. 5 is illustrated in FIG. 7. The normal component of PES 108 is coupled through capacitor C1 and resistor R1 in parallel to node 408. The output 406 of the integrating block is coupled to node 408 through resistor R3. Node 117 is coupled to the inverting input of amplifier A1 through resistor R4. The non-inverting input of amplifier A1 is coupled to ground. The output 120 of amplifier A1 is coupled in a feedback loop to the inverting input through capacitor C2 and to node 408 in a feedback loop through resistor R2.

The design equations are as follows:

$$R_1 = \frac{1}{ZC_1} \quad \text{(Equation 5)}$$

$$R_2 = R_1 A_p \quad \text{(Equation 6)}$$

$$R_3 = \frac{R_2}{A_I} \quad \text{(Equation 7)}$$

$$R_4 = \frac{R_2}{\frac{\omega_n A_p}{ZQ} - (1 + A_I + A_p)} \quad \text{(Equation 8)}$$

$$C_2 = \frac{1}{\omega_n^2 R_2 R_4 C_1} \quad \text{(Equation 9)}$$

Where $A_I$ is the dc gain from node 406 to the output 120 and $A_p$ is the dc gain from node 108 to the output 120.

Procedure:
1. Choose the dynamics of the system by selecting $A_p$, $A_I$, $Z$, $\omega_n$ and Q
2. Choose $C_1$
3. Calculate $R_1$, $R_2$, $R_3$, $R_4$ and $C_2$ The limit of the circuit is as follows: To be realizable, R4 must be positive. Therefore, the denominator of Equation 8 must also be positive. This gives Equation 10.

$$\frac{\omega_n A_p}{ZQ} > 1 + A_I + A_p \quad \text{(Equation 10)}$$

FIRST SAMPLE VELOCITY COMPENSATION

Figure 8A:
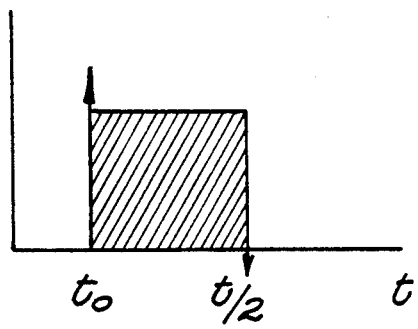
FIG. 8a illustrates the output of the track following loop of the present invention with an early off system.
Figure 8B:
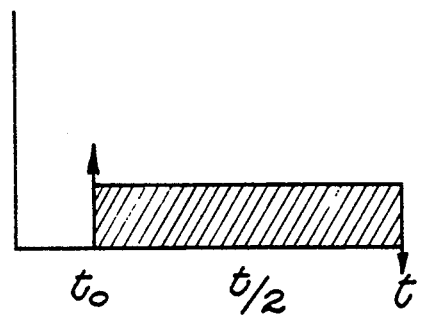
FIG. 8b illustrates the output of the track following loop of the present invention without an early off system.

At the end of a seek operation, the head has a velocity of zero, because it is stopped over a track. However, there is usually a position error at the head location and the PES is generated to compensate for this position error. This can also occur during head switching. The output of the compensating block 402 during the first sample period appears as is shown in FIG. 8A and FIG. 8B. FIG. 8A illustrates the output when an early off system is implemented. FIG. 8B illustrates the output when there is no early off implementation. Referring first to FIG. 8A, there is an impulse at $t_0$ because of the step function of the PES and a second impulse at t/2. The impulses act to correct the position error of the head. The cross-hatched area between the impulses acts to correct velocity error. However, because there is no velocity error during the first sample (the initial velocity is zero) the head overshoots because of excessive velocity correction. Similarly, in FIG. 8B, there is an impulse at time $t_0$ and a second impulse at time t. Again, the cross-hatched area between the impulses represents velocity correction. This is because the actuator fundamentally has a transfer function from current to position of $K_{ACT}/S^2$ and the power amplifier has a current output.

Figure 9:
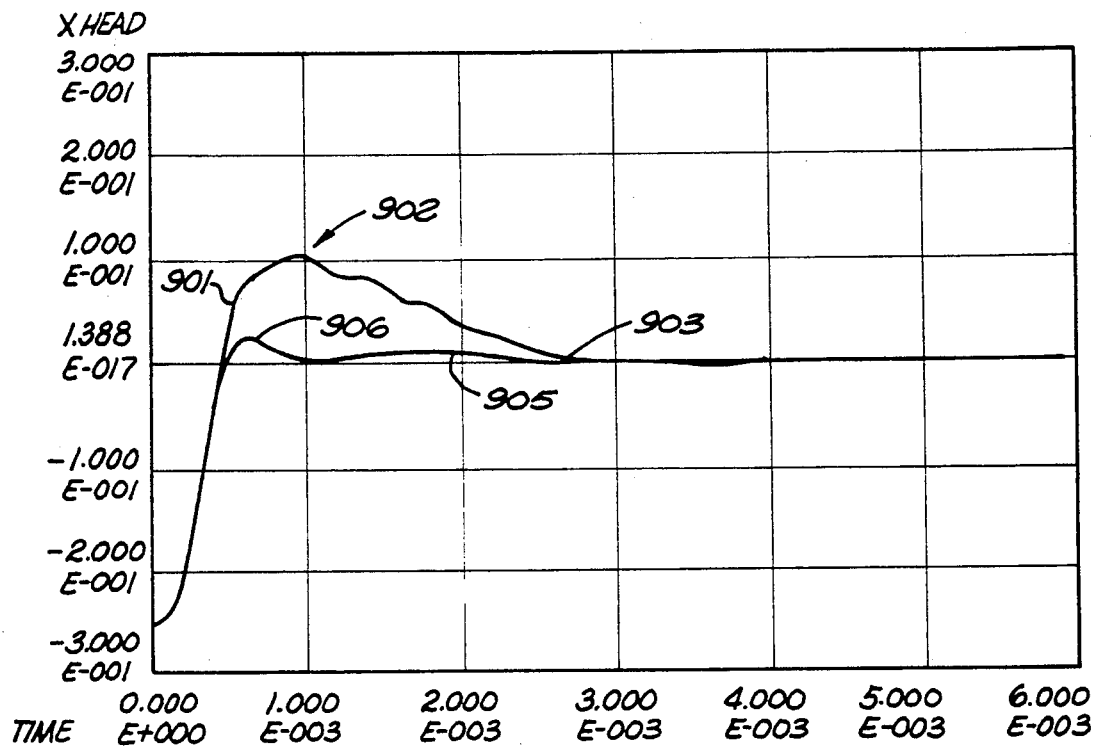
FIG. 9 is a diagram illustrating the effect of overshoot on head position during the first sample.

FIG. 9 illustrates the effect of this overshoot on head position during the first sample period. Curve 901 illustrates head position versus time for a prior art track following loop. At peak 902, there is an overshoot of the desired track position. The system is then corrected and settles to the correct location after several more sample periods at point 903.

The present invention proposes eliminating this velocity correction factor during the first sample period at the end of a seek. In one embodiment, this is accomplished by superimposing a signal having an area equal to the areas of FIG. 8A or 8B, but with a negative magnitude, over the integrator output. This area can be determined by the following equation.

$$X_{IC}(K_{DEMOD})\left(\frac{1}{2}\right)(A_p) = J(K_{DA})(A_I) \quad \text{(Equation 11)}$$

$$J = \frac{\frac{1}{2} \cdot K_{DEMOD} \cdot A_p}{K_{DA} \cdot A_I} \cdot X_{IC} \quad \text{(Equation 12)}$$

Where $X_{IC}$ is the head initial position (the PES at arrival), $K_{DEMOD}$ is the gain of the PES in volts/track, $K_{DA}$ is the DAC gain and $A_I$ and $A_p$ are as previously defined. The $\frac{1}{2}$ is because the early off is set to T/2.

Substituting in appropriate values for $K_{DEMOD}$, $A_p$, $K_{DH}$ and $A_I$, $$J = \frac{\frac{1}{2}(2.5)(.635)}{(0.152)(.959)} = 54.4 \, X_{IC} \quad \text{(Equation 13)}$$

where J = correction factor. So, if the head is ¼ track off, apply a J value of 14 on top of the integrator value to compensate for velocity error.

This correction can easily be implemented in the microprocessor by calculating the compensation value based on the input to the microprocessor and superimposing it on the integrator 402. This is performed only during the first sample. There is some delay in the correction factor, due to the calculation time required. But if the delay is small compared to the band width of the system, negligible error is introduced.

Figure 10:
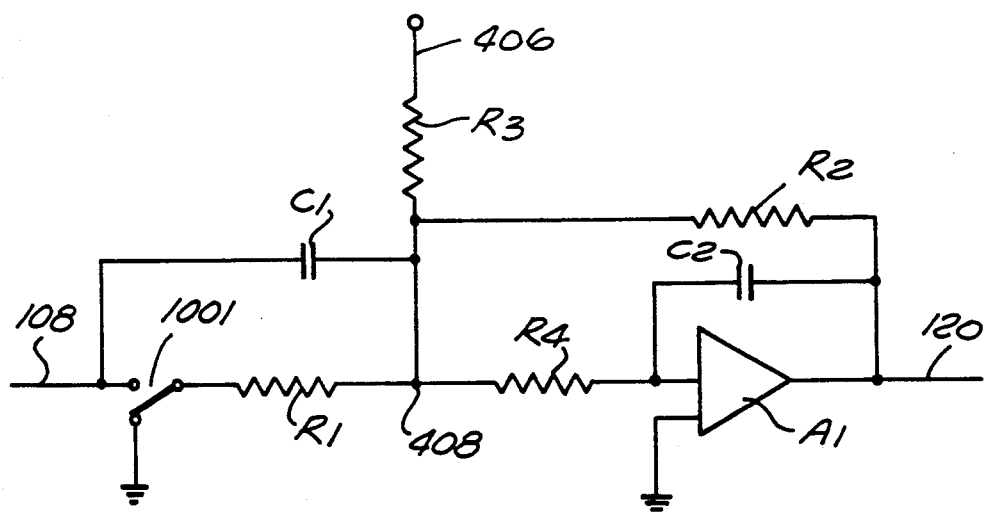
FIG. 10 is a circuit diagram illustrating an embodiment for first sample period velocity compensation.

Another embodiment for sample velocity compensation is illustrated in FIG. 10. In FIG. 10, the circuit of FIG. 7 further includes a switch 1001 that is open during the first sample. This disables or eliminates the velocity correction component of the PES and reduces settling time. By opening switch 1001, the zero is moved from $1/R_1C_1$ to 0Hz. Referring to FIG. 9, curve 905 illustrates the step response versus time for a track following system utilizing the first sample velocity compensation system of the present invention. The overshoot at peak 906 is substantially reduced over peak 902 of curve 901. The settling time to the desired track location is almost immediate after the first sample. This is because the only correction required during the first sample is position and an appropriate position correction will move the head to the desired location. After the first sample, the velocity correction is re-enabled since there will be a velocity of the head at this point.

Thus, an improved method and apparatus for positioning a head over a rotating media data storage system has been described.

We claim:

1. A circuit for providing a position compensation signal comprising:
   receiving means for receiving an error signal and for generating a position error signal (PES) having a normal component and a quadrature component;
   integrating means coupled to said receiving means for integrating said normal component and providing a first output signal;
   compensating means coupled to said receiving means for compensating said normal component and providing a second output signal;
   first summing means coupled to said integrating means and said compensating means for summing said first and second output signals and providing a third output signal;
   filter means coupled to said first summing means for providing a fourth output signal;
   amplifying means coupled to said filter means for generating a fifth output signal;
   actuator control means coupled to said amplifying means and to said receiving means, said actuator control means for providing said error signal.

2. The circuit of claim 1 wherein said integrating means is implemented in a processing means.

3. The circuit of claim 2 wherein said processing means comprises a microprocessor.

4. The circuit of claim 1 wherein said filter means comprises a low pass filter.

5. The circuit of claim 1 further including a switching means disposed between said receiving means and said compensating means for selectively providing said normal component to said compensating means.

6. The circuit of claim 1 wherein said compensating means, said first summing means and said filter means are comprised of:
   a first capacitor and a first resistor coupled in parallel to said normal component and to a first node;
   a second resistor coupled to said first output signal and to said first node;
   a third resistor coupled to said first node and to an input of an amplifier, said amplifier providing said fourth output signal;
   a second capacitor coupled to said fourth output signal and said input of said amplifier;
   a fourth resistor coupled to said fourth output signal and to said first node.

7. An actuator control loop comprising:
   integrating means coupled to a position error signal (PES) and providing a first output signal
   compensating means coupled to said PES for compensating said PES and providing a second output signal;
   summing means coupled to said integrating means and said compensating means for summing said first and second output signals and providing a third output signal;
   filter means coupled to said summing means for providing a fourth output signal.

8. The actuator control loop of claim 7 wherein said integrating means is implemented in a processing means.

9. The actuator control loop of claim 8 wherein said processing means comprises a microprocessor.

10. The actuator control loop of claim 7 wherein said filter means comprises a low pass filter.

11. The actuator control loop of claim 7 further including a switching means disposed between said PES and said compensating means for selectively providing said PES to said compensating means.

12. The actuator control loop of claim 7 wherein said compensating means, said first summing means and said filter means are comprised of:
   a first capacitor and a first resistor coupled in parallel to said normal component and to a first node;
   a second resistor coupled to said first output signal and to said first node;
   a third resistor coupled to said first node and to an input of an amplifier, said amplifier providing said fourth output signal;
   a second capacitor coupled to said fourth output signal and said input of said amplifier;
   a fourth resistor coupled to said fourth output signal and to said first node.

13. A method of providing an actuator control signal comprising the steps of:
- generating a position error signal (PES) and separating a normal component from said PES;
- providing said normal component to an integrating means to generate a first output signal;
- providing said normal component to a compensating means to generate a second output signal;
- summing said first and second output signals to generate a third output signal;
- filtering said third output signal to generate a fourth output signal;
- amplifying said fourth output signal to generate a fifth output signal;
- providing said fifth output signal to an actuator control block to generate said actuator control signal.

14. The method of claim 13 wherein said step of integrating said normal component is performed in a microprocessor.

15. The method of claim 13 wherein said step of filtering said third output signal is performed using a low pass filter.

16. An actuator control loop comprising:
- a first capacitor and a first resistor coupled in parallel to a normal component of a position error signal (PES) and to a first node;
- a second resistor coupled to a first input signal and to said first node;
- a third resistor coupled to said first node and to an input of an amplifier, said amplifier providing a second output signal;
- a second capacitor coupled to said second output signal and said input of said amplifier;
- a fourth resistor coupled to said second output signal and to said first node.

17. A method for providing an actuator control signal comprising the steps of:
- receiving a correction signal having a position error component and a velocity error component;
- in a first sample period, determining said velocity error component;
- generating a compensation signal to reduce the effects of said velocity error component;
- providing said compensation signal and said correction signal to an actuator control loop such that only said position error is corrected.

18. The method of claim 17 further including the step of providing only said correction signal to said actuator control loop in sample periods after said first sample period.

19. The method of claim 17 wherein said compensation signal is generated by:

$$J = \frac{\frac{1}{2} \cdot K_{DEMOD} \cdot A_p}{K_{DA} \cdot A_I} \cdot X_{IC} \quad \text{(Equation 12)}$$

where $X_{IC}$ is the head initial position, $K_{DEMOD}$ is the gain of the PES in volts/track, $K_{DA}$ is the DAC gain and $A_I$ and $A_p$ are DC gain factors.

20. The method of claim 17 wherein said compensation signal is generated by:

$$J = \frac{K_{DEMOD} \cdot A_p}{K_{DA} \cdot A_I} \cdot X_{IC} \quad \text{(Equation 12)}$$

where $X_{IC}$ is the head initial position, $K_{DEMOD}$ is the gain of the PES in volts/track, $K_{DA}$ is the DAC gain and $A_I$ and $A_p$ are DC gain factors.

21. The method of claim 17 wherein said step of generating said compensation signal is accomplished in a microprocessor.

22. An actuator control loop comprising:
- a first capacitor coupled to a normal component of a position error signal (PES) and to a first node;
- switch means having a first terminal coupled to said normal component of said PES;
- a first resistor coupled to a second terminal of said switch means and to said first node;
- a second resistor coupled to a first input signal and to said first node;
- a third resistor coupled to said first node and to an input of an amplifier, said amplifier providing a second output signal;
- a second capacitor coupled to said second output signal and said input of said amplifier;
- a fourth resistor coupled to said second output signal and to said first node.

23. The actuator control loop of claim 22 wherein said switch means is open during a first sample period and closed during subsequent sample periods.

* * * * *